United States Patent Office 3,825,638
Patented July 23, 1974

3,825,638
METHOD FOR PRODUCING COLD BOUND
AGGLOMERATES FROM PARTICULATE
MINERAL CONCENTRATES
Per Gudmar Kihlstedt, Bromma, Sweden, assignor to AB
Cold-Bound Pellets, Djursholm, Sweden
Filed Oct. 14, 1971, Ser. No. 189,080
Claims priority, application Sweden, Oct. 19, 1970,
14,096/70
Int. Cl. C04b
U.S. Cl. 264—63                    17 Claims

ABSTRACT OF THE DISCLOSURE

A method for producing cold bound agglomerates from particulate iron oxide containing mineral concentrates using a steam hardenable binder. The binder is ground down together with iron oxide material at a high energy input to produce a fine grain additive material. The additive material is then mixed with the mineral concentrates and agglomerates are formed from the mixture and steam hardened.

Figure 1:

The present invention relates to a method for producing cold bound agglomerates from a particulate mineral concentrate which has as its main constituent at least one of the metals iron and chromium in oxide form, particularly iron ore concentrate and chromite ore concentrate, the method comprising the steps of mixing such mineral concentrate with a binding agent which is capable of hardening under the influence of steam at elevated temperature and elevated pressure into a matrix enclosing the mineral concentrate particles, producing agglomerates from the mixture of mineral concentrate and binding agent subsequent to slaking hydrateable constituents therein, and causing the binding agent to harden by steam autoclaving the agglomerates.

One object of the present invention is to produce in a method of the aforementioned type agglomerates which when compared with conventional agglomerates of the type envisaged possess a higher degree of mechanical strength per percentage of binding agent embodied therein, thereby enabling agglomerates to be produced which, when compared with the known agglomerates, either have a higher degree of strength or contain a lower percentage of binding agent, or are both stronger and contain less binder.

Another object of the invention is to provide a novel and economic method for producing from particulate iron ore concentrates agglomerates in which the iron oxide particles during the reduction process are so pervious to hot reduction gases and present a so dispersed nucleation that the agglomerates have no or little cladding tendencies and can therefore to advantage be reduced in a solid state.

Still another object of the invention is to provide a novel and economic method which enables small quantities of binding agent to be used when producing from particulate iron ore concentrates which possess high reduction strength and small cladding tendencies, i.e. a tendency to stick together upon reduction at high temperatures. A more specific object of the invention is to produce such agglomerates which can be reduced in a solid state at high temperatures and which have a composition such as to render them suitable for replacing either totally or in large part, scrap in electrosteel processes.

It has previously been proposed in the production of steam hardened agglomerates for the purpose of homogenizing a mixture of a coarse fraction and a fine fraction of a mineral concentrate and a binding agent to subject the materials comprising the mixture to a certain degree of joint grinding, e.g. in a rod mill. In this way, better adhesion between the mineral concentrate particles and the binding agent is obtained as a result of what is termed a mecanochemical reaction.

During the preparatory work carried out on the present invention, it was surprisingly discovered that when steam hardening agglomerates comprising iron oxide material, even such iron oxide material containing high percentages of chromium, such as chromite, which had been intensively jointly ground with a binding agent, a part of the iron oxide chemically reacts with and passes into solution in the binding agent, thereby forming from the binding aspect an active portion of the binding phase. Since the amount of energy required to achieve this is high, it would normally not be economically feasible in practice to grind jointly all the starting material used in producing the agglomerates. In view of this, it is proposed in accordance with the invention when carrying out a method of the type described in the introduction that the binding agent is added to the mineral concentrate as a constituent of an additive material, which is formed by the separate step of jointly grinding the binding agent and iron oxide material, the energy input when jointly grinding the binding agent and iron oxide material being of such magnitude that at least part of the iron oxide material during the subsequent steam hardening of the agglomerates chemically reacts with the binding agent and is dissolved therein.

Steam hardening of the agglomerates is effected in the method of the present invention in a known manner, i.e. the unhardened agglomerates with the hydratable binding agent constituents present therein in a slaked condition, and optionally subsequent to being subjected to a pre-drying step, are treated with steam at a temperature of approximately 160–230° C. and a pressure of approximately 10–70 atm. for approximately 1–20 hours. Since the agglomerates according to the invention are primarily intended to be reduced by means of hot reducing gases, whereby low gas resistance combined with a large contact surface between reduction gas and the agglomerates in the furnace used for the reduction is to advantage, ball shaped agglomerates of substantially uniform size are preferred.

It has been discovered that when jointly ground with a binder at a given energy input the tendency of iron oxide material to react with and dissolve in the binder during the subsequent steam hardening process varies with different types of iron oxides. In those instances when the choice of iron oxide is an arbitrary one, it is naturally preferred to use in the additive material an iron oxide material which requires the least possible energy input when jointly grinding said material and the binding agent. Magnetite and partially reduced iron oxide, especially wüstite, have shown particular tendency to react in a finely divided state with the binding agent and for this reason are preferred as a constituent in the additive material. In order to achieve the object of the present invention, the normal energy input when jointly grinding the iron oxide material and the binding agent is from 10–40 kWh per ton of additive material, although larger energy inputs may be necessary if the reaction tendency of the iron oxide material is low or if the particle size of the iron oxide material is to be greatly reduced when jointly grinding the same and the binding agent. High energy inputs are particularly required when a particularly low content of conventional binding agent is desired in the binding phase, for example when the binding phase is formed by practically solely iron oxide material and the gangue accompanying the same. The iron oxide material and the binding agent are suitably ground together by rapid or highly energetic crushing treatment, preferably in vibration mills, which have been found very suitable in the present connection. Mixing of the additive material and the mineral concentrate can be effected to advantage in a rod mill.

When steam hardening the agglomerates in accordance with the present invention, at least part of the iron oxide material present in the additive material is dissolved in the binding agent, a gel substance being formed which then hardens to form a binding-substance matrix which envelopes the particles of the mineral concentrate and which gradually crystallizes into minute crystals of different composition. When using a binding agent comprising slaked lime and finely divided silica, iron hydrates, calcium hydrosilicates, iron hydrosilicates, iron calcium hydrosilicates and calcium ferrates were observed when examining such binding-substance matrices by qualitative X-ray analysis.

Binding agents which can be used when practicing the method of the present invention include, inter alia, conventional binding agents normally used with steam hardened agglomerates, for example slaked lime, slaked steel furnace slag, slaked blast furnace slag, silicon dioxide, this latter being preferably in a very finely divided form, such as flue dust taken from metallurgical processes for the manufacture of silicon iron, and cement or mixtures thereof, optionally with additions of gangue and reactive $Al_2O_3$. It is, however, also possible to prepare a special binding agent which will afford additional favourable effects during the subsequent reduction of the agglomerates or to incorporate in conventional binding agents a material which will provide the same favourable effects. For example, the binding agent may be selected so that the hardened agglomerates contain in the binder phase a surplus of slaked lime which during the reduction of the agglomerates diffuses to a certain extent into the wüstite lattice and increases the strength of the lattice, with a lower plasticity of the partially reduced agglomerates as a result thereof. Furthermore, for the purpose of avoiding cladding problems when directly reducing the agglomerates, i.e. a reduction process without simultaneous melting, by means of hot reducing gases, especially such rich in carbon monoxide, one or more of the metal compounds MgO, MnO, $Al_2O_3$ and $TiO_2$ may be incorporated in the binding agent or iron oxide material of the additive material. Although the said compounds are preferably present in the form of a solid solution in finely divided iron oxide, suitably in magnetite or partially reduced iron oxide, such as wüstite, they may also be present in a free form, a hydrated form or a hydrosilicate bound form, or in a combination of these forms. When reducing the agglomerates with gases rich in carbon monoxide at elevated temperatures, the metal compounds in the aforementioned forms are able to penetrate the iron oxide particles of the agglomerates and appear to etch or form pores in the surface of the iron oxide particles in a manner whereby the surface of the particles allows the carbon dioxide gas formed during the process of reduction to pass therethrough, while at the same time the metal compounds give rise to dispersed nucleation when reducing out pure iron, thereby eliminating the formation of pure iron flakes which jut out from the surface layers of the partially reduced iron oxide particles, such flaking being a typical occurrence when reducing iron oxide particles from wüstite to iron by means of gases rich in carbon monoxide within a temperature range of 800–1000° C. As is well known, such flaking causes the partially reduced iron oxide particles to obtain a rugged, burr-like surface which is often accompanied by excessive swelling, and results in cladding tendencies. In this connection, it is not yet known whether the metal compounds MgO, MnO, $Al_2O_3$ and $TiO_2$ penetrate in their entirety into the iron oxide particles or whether it is only the metals of the compounds which penetrate into said particles. It is probable that the mentioned metal compounds diffuse into magnetite as MgO, MnO, $Al_2O_3$ and $TiO_2$, while the circumstances when the iron oxide has reached the wüstite phase is more obscure. The requisite quantity of the mentioned metal compounds is, to a certain extent, dependent on the composition of the additive material in general and on the composition of the iron ore concentrate and on the composition and temperature of the gas used to reduce the hardened agglomerates, the quantity of the metal compounds decreasing with increasing reduction temperature. However, the quantity of metal compounds required to produce the desired effect can be readily established in each individual case e.g. by experimentation on a small scale. The ability of the mentioned metal compounds to penetrate the iron oxide in the agglomerates at reduction temperatures below 800° C., however, is of no interest, since cladding problems arising as a result of the burr-like surface of the partially reduced iron oxide particles are not though to exist below this temperature. Neither do burr-like surfaces with subsequent cladding problems occur on the iron oxide particles in the agglomerates during the reduction thereof with gases rich in carbon-monoxide at very high temperatures, for example above 1100° C. The metal compounds MgO, MnO, $Al_2O_3$ and $TiO_2$ can be incorporated in the additive material in relatively small quantities to provide the aforementioned advantages, provided that the compounds are in a suitable reactive form. Thus, the quantity required can be as small as from 0.1–1%, calculated on the dry weight of the additive material, if the compounds are included as a solid solution in a finely divided iron oxide material which has been jointly ground with the remainder of the additive material. When the mentioned metal compounds are embodied in the additive material in a free, hydrated or hydrosilicate-bound form, the quantity of the compounds needed to inhibit cladding is normally up to ten times that required when the metal compounds are embodied as a solid solution in a finely divided iron oxide material forming part of the additive material.

Silicate bound metal compounds of the above type, e.g. MgO in blast furnace and steel furnace slag as well as $Al_2O_3$ in cement, do not provide the cladding inhibiting effect according to the above, since they are stably bound. It should be mentioned in this connection that the cladding inhibiting effect can not of course be obtained with sintered agglomerates, since in the case of sintered agglomerates all the reactions which affect the surface of the iron oxide particles, and the crystal lattice have already taken place during the sintering process and can not therefore have any influence on the process of reduction of the agglomerates.

By selecting a binding agent which contains at least 20%, preferably at least 25% MgO, calculated on the weight of the binding agent in dehydrated form, and particularly a binding agent which in dehydrated form in addition to MgO comprises substantially CaO, and by at the same time using mineral concentrates and iron oxide materials poor in gangue, agglomerates can be produced which are not encumbered with the aforementioned cladding tendency as a result of the formation of burr-like surfaces on the iron oxide particles when reducing the agglomerates with hot gases rich in carbon monoxide, and the binding substance matrix of which agglomerates does not present any marked tendency to soften and thereby cause cladding when directly reducing the agglomerate by means of reducing gases at very high temperatures, for example from 950° C. up to approximately 1200° C. It is to particular advantage to use a binding agent which in hydrated form comprises substantially solely MgO and CaO if the agglomerates in a reduced state are to be used to replace scrap in electrosteel processes, the content of MgO in the binding agent suitably constituting at least approximately 40% by weight. In this connection, it is also suitable that the binding agent in dehydrated form comprises less than 10%, suitably approximately 3–6% of the weight of the starting mix from which the agglomerates are formed.

In order to ensure that the agglomerates are sufficiently strong to withstand transportation, i.e. so that they do not disintegrate while being conveyed between the agglomerating plant and the reduction plant and have sufficient reduction strength to prevent them from disintegrating during the reduction process, it is often necessary to take certain measures, especially when only small contents of binding agent are used in the agglomerates. Thus, the particle size of the starting material from which the agglomerates are formed should be selected in a manner to obtain close packing of the particles within the agglomerates, suitably so that the porosity of the agglomerates is below 0.3. For example, a suitable degree of compactness can be obtained by selecting as starting material approximately 50–80% by weight of mineral concentrate with a normal coarse size of, for example, 80% by weight finer than 0.2 mm., and the remainder iron oxide material and binding agent of finer particle size in comparison with the mineral concentrate, for example 80% by weight finer than 0.06 mm. or an even finer particle size, the best degree of compactness being obtained when the iron oxide material and the binding agent together comprise approximately 25–35% of the total particle volume of the starting material.

Slaking of the hydrateable constituents of the binding agent can be effected at any time prior to hardening the agglomerates, although it is preferred that slaking is carried out when jointly grinding the constituents in the additive material, particularly when difficultly slaked material such as MgO, is present in the binding agent. At least a certain degree of after-slaking can be permitted to take place after the joint grinding operation, by storing the additive material in a moist condition for a period of time, which, for example, stretches over a few days or even longer.

The cladding tendency of the agglomerates can also be reduced by coating the agglomerates with a pulverulent material rich in MgO. This should suitably be done in the final stage of the agglomerating process or immediately thereafter, while the unhardened agglomerates are moist.

The coating material, in which the hydratable constituents should be in a slaked condition, may be dusted onto the unhardened agglomerates or the agglomerates may be rolled in the coating material. When the agglomerates are in the form of pellets, the coating material, irrespective of whether it is powdered onto the pellets or whether the pellets are rolled therein can be applied to the agglomerates either in the pelletizing apparatus used for agglomerating the particles or in a special after-rolling apparatus, a slightly higher degree of compactness of the particles in the pellet and greater strength of the pellets being obtained in the latter instance. When the agglomerates are subsequently steam hardened, the coating material adheres strongly to the agglomerates and forms an essentially refractory coating around the same.

Since in the method of the present invention the additive material is prepared in a process which is separate from the remaining steps of the method, it has been found suitable from a technical and economic aspect to produce the additive material in a few selected plants provided with advanced equipment constructed for preparing such additive material, these plants being situated in the proximity of mineral deposits particularly suitable as ingredients in additive material of the type in question. The prepared additive material with the hydratable ingredients in slaked condition embodied therein can then be transported to agglomerating plants, in which the additive material is mixed in suitable proportions with mineral concentrates produced by conventional ore dressing processes or other metal oxide treatment processes, whereafter the mixture is agglomerated and the agglomerates hardened in a steam atmosphere.

The effect obtained when practicing the method of the present invention is evident from the accompanying drawing, in which FIG. 1 illustrates a portion of a steam hardened agglomerate of particulate iron ore concentrate enlarged approximately 600 times. The additive material in the illustrated instance comprised a magnetite concentrate and slaked lime which had been jointly ground in a weight ratio of 4:1 by means of a continuously operating vibration mill at an energy input corresponding to 15 kw. h. per ton of additive material, and the additive material, which had an approximate particle size of 80% by weight less than 0.05 mm., was mixed with the iron ore concentrate in a weight ratio of 1:2.5.

Figure 2:
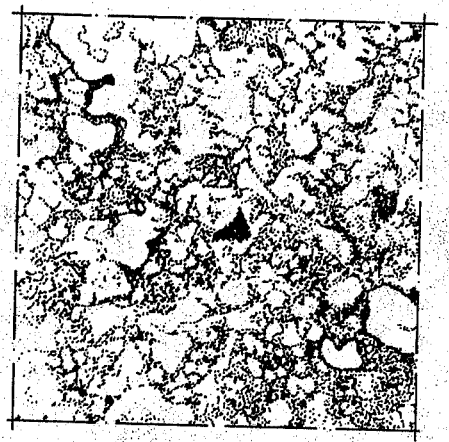

FIG. 2 illustrates a portion of the light coloured binder substance matrix shown in FIG. 1 enlarged roughly 4000 times, from which it can be seen that the iron oxide particles originally present in the additive material have substantially completely dissolved in the original binding agent to form a gel substance in which a large number of minute crystals having a size of about 1–2 $\mu$m. have crystallized out. A qualitative X-ray analysis of the substance showed that it comprised iron oxide, $Ca(OH)_2$, calcium ferrates, iron calcium hydrosilicates and iron hydrosilicates. The iron oxide material present in the additive material had thus formed an active portion of the binding substance from a binding aspect.

The advantages afforded by the method of the present invention will now be illustrated with reference to a number of examples.

Example 1

An additive material was prepared by jointly grinding 45% by weight of a low-reactive basic steel furnace slag, 5% by weight CaO and 50% by weight pure magnetite concentrate. The joint grinding process was carried out in a vibration mill with a net energy input of 30 kw. h. per ton of additive material and water was supplied to the mill in a quantity sufficient to effect slaking of the slakeable constituents, the additive material obtaining a particle size of 80% by weight finer than 0.035 mm. The additive material was then stored in a moist condition for one week, complete slaking of the slakable constituents being obtained therewith. Subsequent to this, the additive material was mixed in a rod mill with a phosphorus-containing iron ore, having a particle size of 80% by weight less than 0.5 mm. at a ratio by weight of 1:2.5, at a net energy input of 5 kw. h. per ton of mixture. The mixture was then rolled into pellets having a diameter of approximately 12.5 mm. and the pellets were steam-hardened in an autoclave at approximately 195° C. and a corresponding pressure for 8 hours. Despite the low reactivity of the steel furnace slag, the pellets obtained presented a reduction strength of 45 kp. per pellet at 1000° C. while using a CO-containing gas as a reduction agent. It is often desirable to return to the blast furnace low reactive steel furnace slag, and previously it has been difficult to utilize such slag in large quantities for the purpose of binding agglomerates. This deficiency is now removed by means of the method according to the invention.

Example 2

A starting material intended for use in the agglomeration of particulate iron ore concentrates was prepared by mixing in a rod mill 80% by weight hematite ore concentrate, having a particle size of 80% by weight below 0.2 mm., and 20% by weight additive material comprising an intensively jointly ground mixture of equivalent parts by weight of slaked lime and a magnetite ore concentrate containing approximately 0.2% by weight MgO and approximately 0.3% by weight $TiO_2$ in solid solution therein. The energy input during the joint grinding process was 20 kw. h. per ton of additive material and the particle size of the additive material was 80% by weight below 0.04 mm. The starting material was then pelletized and the pellets hardened by exposing the same to a steam atmosphere in an autoclave at a temperature of approximately 200° C. and a corresponding pressure for 6 hours. Upon reduction of the pellets in a furnace at approximately 950° C. with a gas of substantially blast furnace simulating composition the pellets presented a very low cladding tendency. No swelling of the pellets over and above that which is unavoidable upon the transition of hematite to magnetite was observed. The reduction strength of the pellets obtained exceeded many times the reduction strength of conventional sintered pellets and their reduceability was also considerably higher than in the case of sintered pellets.

Example 3

An additive material was prepared by jointly grinding a substantially gangue free magnetite concentrate and a binding agent, obtained by slaking burned dolomite, in a weight ratio of 4:1. The grinding process was effected in a continuously operating vibration mill with an energy input corresponding to 15 kw. h. per ton of additive material, the additive material obtaining an approximate particle size of 80% by weight less than 0.05 mm. For the purpose of forming a starting material suitable for agglomerating purposes, the additive material was mixed with a moist magnetite concentrate poor in gangue in a weight ratio of 1:2.5. The magnetite concentrate had an approximate particle size of 80% by weight less than 0.2 mm. The mixture was effected in a rod mill while simultaneously grinding the mixture at an energy input corresponding to approximately 3 kw. h. per ton of starting material. Pellets having a diameter of approximate 12.5 mm. were then formed on a pellet rolling plate while adding appropriate quantities of water for pelletizing purposes, and a powder comprising burned and slaked sea water magnesite was applied to the pellets on the plate when the pellets were practically formed in a quantity of approximately 1% by weight of the starting material.

The pellets thus coated with substantially pure

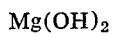

$Mg(OH)_2$ were then steam treated in an autoclave for 8 hours at approximately 200° C. and a corresponding pressure. Subsequent to being stored for two days, the obtained pellets had a compression strength of approximately 40 kp. per pellet, which was found to be fully sufficient for the reduction process and for handling and transporting purposes prior thereto.

The pellets produced were divided into two batches. One batch was reduced with gas rich in carbon monoxide in a sponge iron furnace operating according to the Wiberg-Söderfors process at a temperature of approximately 950° C., while the other batch was reduced with hydrogen gas at a temperature of approximately 1100° C. Both of the reduction processes could be carried out without the occurrence of troublesome cladding phenomena, which would have been completely impossible when using conventional burned sintered pellets. The obtained reduced pellets could be charged to advantage directly to an electro-steel furnace as replacement for 60% by weight of the normal scrap charge, the binding agent in the pellets replacing to a considerable extent the normal slag forming ingredients in the electro-steel process.

Example 4

Subsequent to being subjected to a preparatory grinding process, basic steel furnace slags obtained from a high-grade steel works were worked up by dry strong-magnetic separation, a substantially wüstite-like material being obtained containing, in addition to iron oxide, approximately 20% by weight MnO and approximately 15% by weight calcium silicate material. The thus obtained dry material was mixed with a product containing substantially iron oxides and calcium oxides and obtained from the dust separator of an oxygen gas refining process, and with burned lime in a weight ratio of 5:2:3. The mixture was then finely ground in a vibration mill while adding water in quantities sufficient to slake the slakable ingredients of the mixture and while applying a net energy input of kw. h. per ton of mixture. The obtained mixture was found suitable as an additive material for use in the manufacture of steam hardened agglomerates of both hematite and magnetite concentrates for charging to a blast furnace.

Example 5

A fine chromite concentrate was jointly ground in a vibration mill with a ferrochromium slag and with silicon fume, taken from a metallurgical silicon iron manufacturing process, in a weight ratio of 10:3:2 with a net energy input of 20 kw. h. per ton of mixture and while adding water in quantities sufficient to slake the slakable ingredients of the mixture. The obtained mixture was used as an additive material for a relatively coarse grain chromite concentrate in a weight ratio of 1:2.5, the resulting mixture being agglomerated and steam hardened in an autoclave to form agglomerates favourable for the manufacture of ferrochromium. By this method a large amount of ferrochromium slag can be used in the binding agent.

The invention also relates to agglomerates and additive material produced in accordance with the aforegoing and in accordance with the following claims.

I claim:

1. In a method for producing cold bound agglomerates from a particulate mineral concentrate which has as its main constituent at least one of the metals iron and chromium in oxide form, comprising the steps of mixing said mineral concentrate with a particulate binding agent selected from the group consisting essentially of slaked lime, slaked dolomite, slaked steel furnace slag or silicon dioxide or mixtures thereof, producing agglomerates from the mixture of mineral concentrate and binding agent and causing said binding agent to harden by steam curing the agglomerates at a temperature of about 160–230° C. and a pressure of about 10–70 atmospheres for about 1–20 hours, the improvement comprising adding said binding agent to said mineral concentrate as a constituent of an additive material which is formed in a separate step by jointly grinding said binding agent and a particulate iron oxide material, the energy input when jointly grinding the binding agent and said iron oxide material amounting to about 10–40 kw. h. per ton additive material to cause at least part of the iron oxide material to chemically react with the binding agent and be dissolved therein during the subsequent steam hardening of the agglomerates.

2. A method according to claim 1, wherein the joint grinding of the binding agent and the iron oxide material is effected by highly energetic crushing.

3. A method according to claim 1, wherein the iron oxide material in the additive material is in the form of magnetite.

4. A method according to claim 1, wherein the iron oxide material in the additive material is partially reduced chemically.

5. A method according to claim 4, wherein said iron oxide which is partially reduced chemically is wüstite.

6. A method according to claim 1, wherein an additive material is used which contains at least one of the metal compounds selected from the group consisting of MgO, MnO, $Al_2O_3$, and $TiO_2$ in such quantities and form that upon reduction of the iron oxides present in said agglomerates at a temperature of at least 800° C. part of the metal present in said metal compound diffuses into said iron oxides.

7. A method according to claim 6, wherein an additive material is used in which at least one of the metal compounds selected from the group consisting of MgO, MnO, $Al_2O_3$, and $TiO_2$ is present substantially in the form of a solid solution in finely divided iron oxide and in a quantity of at least 0.1% calculated on the weight of said additive material.

8. A method according to claim 7, wherein said finely divided iron oxide is in the form of magnetite.

9. A method according to claim 8, wherein said finely divided iron oxide is partially reduced chemically.

10. A method according to claim 7, wherein said finely divided iron oxide which is partially reduced chemically is wüstite.

11. A method according to claim 1, wherein a binding agent is used which contains at least 20% MgO calculated on the weight of the binding agent in dehydrated form.

12. A method according to claim 11, wherein a binding agent is used which, in dehydrated form, comprises substantially solely MgO and CaO.

13. A method according to claim 12, wherein the content of MgO in the binding agent is at least 40% by weight.

14. A method according to claim 1, comprising using a binding agent which in dehydrated form comprises less than 10% by weight of the agglomerates.

15. A method according to claim 14, wherein the amount of binding agent is 3-6% by weight of said agglomerates.

16. A method according to claim 1, wherein the agglomerates are coated with powder a material rich in MgO.

17. A method according to claim 16, wherein said material is applied to the agglomerates in slaked form prior to hardening the agglomerates.

References Cited

UNITED STATES PATENTS

| | | | |
|---|---|---|---|
| 3,235,371 | 2/1966 | Volin et al. | 75—3 |
| 3,214,263 | 10/1965 | O'Connor | 75—3 |
| 3,252,810 | 5/1966 | Somers | 264—63 X |
| 3,238,048 | 3/1966 | Somers | 264—63 X |
| 3,252,809 | 5/1966 | Somers | 264—63 X |
| 3,238,049 | 3/1966 | Somers | 264—63 X |
| 2,904,444 | 9/1959 | Hoopes et al. | 106—78 |
| 3,682,619 | 8/1972 | Holley | 264—82 UX |
| 3,661,554 | 5/1972 | Wijard et al. | 75—3 |

DONALD J. ARNOLD, Primary Examiner

U.S. Cl. X.R.

264—82, 117